United States Patent
Vasconcelos Pacheco et al.

(10) Patent No.: US 12,440,430 B2
(45) Date of Patent: Oct. 14, 2025

(54) USE OF TETRAPEPTIDES AND FUNCTIONALISED MICROCAPSULES AS SKIN PENETRATION CARRIERS

(71) Applicant: INFINITEC ACTIVOS S L, Barcelona (ES)

(72) Inventors: Aimée Vasconcelos Pacheco, Barcelona (ES); Ramona Galatola, Barcelona (ES); Marisabel Mourelle Mancini, Barcelona (ES)

(73) Assignee: INFINITEC ACTIVOS S L, Barcelona (ES)

( * ) Notice: Subject to any disclaimer, the term of this patent is extended or adjusted under 35 U.S.C. 154(b) by 684 days.

(21) Appl. No.: 17/759,131

(22) PCT Filed: Jan. 21, 2021

(86) PCT No.: PCT/EP2021/051252
§ 371 (c)(1),
(2) Date: Jul. 20, 2022

(87) PCT Pub. No.: WO2021/148496
PCT Pub. Date: Jul. 29, 2021

(65) Prior Publication Data
US 2023/0132979 A1     May 4, 2023

(30) Foreign Application Priority Data

Jan. 23, 2020   (EP) .................... 20382036

(51) Int. Cl.
| A61K 8/11 | (2006.01) |
| A61K 8/49 | (2006.01) |
| A61K 8/64 | (2006.01) |
| A61K 8/85 | (2006.01) |
| A61Q 19/00 | (2006.01) |

(52) U.S. Cl.
CPC .............. *A61K 8/11* (2013.01); *A61K 8/498* (2013.01); *A61K 8/64* (2013.01); *A61K 8/85* (2013.01); *A61Q 19/00* (2013.01)

(58) Field of Classification Search
None
See application file for complete search history.

(56) References Cited

U.S. PATENT DOCUMENTS

| 9,333,163 B2 | 5/2016 | Farokhzad et al. |
| 9,745,346 B2 | 8/2017 | Mourelle Mancini et al. |
| 11,202,814 B2 | 12/2021 | Mourelle et al. |
| 2011/0207653 A1 | 8/2011 | Raiche et al. |
| 2016/0250128 A1 | 9/2016 | Mourelle Mancini et al. |
| 2017/0081364 A1 | 3/2017 | Mourelle Mancini et al. |
| 2018/0258140 A1 | 9/2018 | Mourelle Mancini et al. |
| 2019/0240271 A1 | 8/2019 | Mourelle et al. |
| 2021/0015724 A1 | 1/2021 | Mourelle Mancini et al. |
| 2021/0121376 A1 | 4/2021 | Mourelle Mancini et al. |

FOREIGN PATENT DOCUMENTS

| EP | 3791852 | 3/2021 |
| EP | 3854387 | 7/2021 |
| WO | 2016/135203 | 9/2016 |
| WO | 2017/210666 | 12/2017 |
| WO | 2020/018455 | 1/2020 |
| WO | 2021/148496 | 7/2021 |

OTHER PUBLICATIONS

Sun. Chinese Chemical Letters, 2019, 30, 1435-1439 (Year: 2019).*
International Search Report dated Apr. 20, 2021, in PCT/EP2021/051252, 5 pages.
Written Opinion dated Apr. 20, 2021, in PCT/EP2021/051252, 6 pages.
U.S. Appl. No. 12/968,624, filed Dec. 15, 2010, 2011/0207653, Raiche et al.
U.S. Appl. No. 15/032,512, filed Apr. 27, 2016, 2016/0250128, Mancini et al.
U.S. Appl. No. 15/553,585, filed Aug. 25, 2017, 2018/0258140, Mancini et al.
U.S. Appl. No. 17/042,500, filed Sep. 28, 2020, 2021/0015724, Mancini et al.
U.S. Appl. No. 17/057,142, filed Nov. 20, 2020, 2021/0121376, Mancini et al.
Berge et al., "Pharmaceuticals Salts", Journal of Pharmaceutical Sciences, vol. 66, No. 1, Jan. 1977, pp. 1-19.
IUPAC-IUB Joint Commission on Biochemical Nomenclature (JCBN), "Nomenclature and Symbolism for Amino Acids and Peptides", Recommendations 1983, Eur. J. Biochem, vol. 138, 1984, pp. 9-37.

* cited by examiner

*Primary Examiner* — Noble E Jarrell
(74) *Attorney, Agent, or Firm* — Grüneberg and Myers PLLC

(57) ABSTRACT

Microcapsules contain a peptide (I), and peptides (II) or (III) coupled to a PLGA-containing polymeric shell. The microcapsules can be used to enhance skin penetration of active ingredients encapsulated therein, particularly in the field of cosmetics. A process can be used for preparing the microcapsules, and compositions can contain said microcapsules. The microcapsules can be used as a transdermal delivery system for the active ingredients encapsulated therein.

18 Claims, No Drawings
Specification includes a Sequence Listing.

SEQUENCE LISTING

```
<160> NUMBER OF SEQ ID NOS: 3

<210> SEQ ID NO 1
<211> LENGTH: 12
<212> TYPE: PRT
<213> ORGANISM: Artificial Sequence
<220> FEATURE:
<223> OTHER INFORMATION: Synthetic peptide

<400> SEQUENCE: 1

Lys Phe Asn Leu Pro Ala Gly Asn Tyr Lys Lys Pro
1               5                   10

<210> SEQ ID NO 2
<211> LENGTH: 5
<212> TYPE: PRT
<213> ORGANISM: Artificial Sequence
<220> FEATURE:
<223> OTHER INFORMATION: Synthetic peptide

<400> SEQUENCE: 2

Lys Thr Thr Lys Ser
1               5

<210> SEQ ID NO 3
<211> LENGTH: 4
<212> TYPE: PRT
<213> ORGANISM: Artificial Sequence
<220> FEATURE:
<223> OTHER INFORMATION: Synthetic peptide
<220> FEATURE:
<221> NAME/KEY: MISC_FEATURE
<222> LOCATION: (1)..(1)
<223> OTHER INFORMATION: This residue is D-arg.
<220> FEATURE:
<221> NAME/KEY: MISC_FEATURE
<222> LOCATION: (3)..(3)
<223> OTHER INFORMATION: This residue is ornithine.

<400> SEQUENCE: 3

Arg Tyr Xaa Phe
1
```

USE OF TETRAPEPTIDES AND FUNCTIONALISED MICROCAPSULES AS SKIN PENETRATION CARRIERS

CROSS-REFERENCE TO RELATED APPLICATIONS

This application is the National Stage entry under § 371 of International Application No. PCT/EP2021/051252, filed on Jan. 21, 2021, and which claims the benefit of priority to European Application No. 20382036.0, filed on Jan. 23, 2020. The content of each of these applications is hereby incorporated by reference in its entirety.

REFERENCE TO A SEQUENCE LISTING

The present application is accompanied by an ASCII text file as a computer readable form containing the sequence listing entitled, "004064USPCT_SL_ST25.txt", created on Aug. 3, 2022, with a file size of 1,061 bytes, the content of which is hereby incorporated by reference in its entirety.

BACKGROUND OF THE INVENTION

Field of the Invention

The present invention relates to the field of cosmetics, in particular, it relates to the use of tetrapeptides for the preparation of microcapsules, to microcapsules comprising said tetrapeptides and to their use to enhance skin penetration of substances encapsulated therein.

Description of the Related Art

The penetration of substances through the epidermis is one of the challenges for developers of topical products designed for the dermal delivery of active substances through the skin. Numerous methods for achieving this have been and continue to be explored. One well-known approach is to use excipients that can accelerate the passage of active substance through the stratum corneum by altering the state of the lipids in the stratum corneum or by increasing the solubility of the drug in the stratum corneum. Materials that can do this are often called "penetration enhancers". Classic examples of potent and broad-spectrum penetration enhancers include isopropyl myristate, decyl oleate, oleyl alcohol, octyldodecanol, propylene glycol, dimethyl sulfoxide and triacetin.

It has also been proposed to use chemically stable biodegradable delivery vehicles that can release active substances at the targeted tissue or area. One of the proposed routes is the encapsulation of active substances in polymeric microcapsules. Poly(D,L-lactide-co-glycolide) acid (PLGA) has been described as a promising synthetic polymer for different biomedical applications, including their implications in designing competent drug delivery systems. Using PLGA, it is possible to encapsulate a variety of substances both hydrophilic and hydrophobic with size ranging from small molecules to macromolecules to deliver them at various targeted locations through transdermal drug delivery.

SUMMARY OF THE INVENTION

The inventors have surprisingly found that microcapsules comprising a polymeric shell, wherein the latter is functionalized by covalent coupling of a specific first peptide of formula (I) and a second peptide selected from the group consisting of peptide (II) and peptide (III), show outstanding skin penetration behavior. The peptides used to functionalize the polymeric shell have the sequences shown as (I), (II) and (III) below:

(I) D-Arg-Tyr-Orn-Phe-$NH_2$ (SEQ ID NO: 3-$NH_2$)

(II) Lys-Phe-Asn-Leu-Pro-Ala-Gly-Asn-Tyr-Lys-Lys-Pro-$NH_2$ (SEQ ID NO: 1-$NH_2$)

(III) Lys-Thr-Thr-Lys-Ser-OH (SEQ ID NO: 2-OH)

and cosmetically acceptable salts and solvates thereof.

Thus, in a first aspect the present invention relates to a microcapsule comprising a polymeric shell and a first peptide of formula (I)

(I) D-Arg-Tyr-Orn-Phe-$NH_2$ (SEQ ID NO: 3-$NH_2$)

coupled to said polymeric shell, wherein a second peptide selected from the group consisting of peptides of formula (II) and (III)

(II) Lys-Phe-Asn-Leu-Pro-Ala-Gly-Asn-Tyr-Lys-Lys-Pro-$NH_2$ (SEQ ID NO: 1-$NH_2$)

(III) Lys-Thr-Thr-Lys-Ser-OH (SEQ ID NO: 2-OH)

is also coupled to said polymeric shell.

In a second aspect, the present invention provides a process for obtention of the microcapsules as defined in the first aspect comprising the steps of:

a) coupling a first peptide of formula (I) as defined in the first aspect of the invention to a first portion of the microcapsule's shell-forming polymeric material;
b) preparing an activated form of a second portion of the shell-forming polymeric material by reaction with a suitable coupling agent;
c) adding a solution of the material obtained in step a) in a first solvent and a solution of the material obtained in step b) in a second solvent to an aqueous solution, optionally comprising a second shell-forming polymeric material and optionally comprising a material to be encapsulated, thereby obtaining a colloidal suspension;
d) evaporating said first and second solvents;
e) adding a second peptide selected from the group consisting of peptides of formulae (II) and (III) to the material obtained in step d);
f) incubating the mixture resulting from step e), wherein microcapsules functionalized with said first and second peptides are obtained;
g) isolating the microcapsules functionalized with said first and second peptides.

In a third aspect, the present invention provides a composition comprising a microcapsule as defined in the first aspect, further comprising at least one cosmetically acceptable excipient or adjuvant.

In a fourth aspect, the present invention relates to the use of a peptide of formula (I) as defined in the first aspect of the invention for the preparation of microcapsules having an outer layer comprising said peptide.

In a fifth aspect, the present invention relates to the use of the microcapsules of the first aspect as a transdermal delivery system for the activated ingredient encapsulated therein.

In a sixth aspect, the present invention relates to a method for the transdermal delivery of active ingredients comprising the administration to the skin of said ingredients encapsulated in microcapsules defined in the first aspect.

DETAILED DESCRIPTION OF THE INVENTION

The first aspect the present invention relates to a microcapsule comprising poly(D,L-lactide-co-glycolide) acid (PLGA) and a first peptide of formula (I)

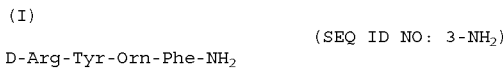

(I)
(SEQ ID NO: 3-NH$_2$)
D-Arg-Tyr-Orn-Phe-NH$_2$ coupled to said polymeric shell,
wherein a second peptide selected from the group consisting of peptides of formula (II) and (III)

(II)
(SEQ ID NO: 1-NH$_2$)
Lys-Phe-Asn-Leu-Pro-Ala-Gly-Asn-

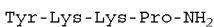

Tyr-Lys-Lys-Pro-NH$_2$

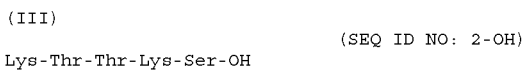

(III)
(SEQ ID NO: 2-OH)
Lys-Thr-Thr-Lys-Ser-OH is also coupled to said polymeric shell.

As used in the context of the present invention the term "microcapsule" refers to a particle consisting of a shell comprising a wall-forming material and an encapsulated core located within the shell and having a size ranging from 10 to 10000 nm.

In an embodiment the microcapsules have a size (as determined by Dynamic Light Scattering (DLS) ranging from 50 to 5000 nm, preferably from 100 to 1000 nm, more preferably from 150 to 450 nm, more preferably from 180 to 400 nm, still more preferably from 200 to 300 nm and most preferably from 230 to 270 nm. This size allows the microcapsule to be uptaken by the cells. In a particular embodiment, the average size of the microcapsules is 250 nm.

In a particular embodiment, the microcapsules according to the invention, have a shell comprising more than one layer. In a preferred embodiment, the microcapsules are bilayered capsules, comprising an inner layer and an outer layer.

In a preferred embodiment, the shell comprises one or more polymers, wherein the inner layer polymer is poly(D,L lactide-co-glycolide) acid (PLGA) and the outer layer polymer is polyvinyl alcohol (PVA).

In a preferred embodiment, at least some of the functional groups of the inner layer polymer, preferably when the functional groups are carboxyl groups of the inner layer polymer, are present in the outer surface of the microcapsule, together with the polymer in the outer surface of the microcapsule. In a more preferred embodiment, the carboxyl groups from the PLGA polymer are present on the outside surface of the microcapsule. In a more preferred embodiment, preferably, PLGA has a lactide/glycolide molar ratio from 40:60 to 90:10 preferably from 40:60 to 80:20, more preferably from 40:60 to 70:30, still more preferably from 40:60 to 60:40 and most preferably 50:50.

Suitable PLGA polymers for the microcapsules of the invention have molecular weights comprised between 7000 Da and 54000 Da, for example a polymer with a molecular weight ranging from 7000 to 17000 Da, a polymer with a molecular weight ranging from 24000 Da to 38000 Da, a polymer with a molecular weight ranging from 38000 Da to 54000 Da, preferably a polymer with a molecular weight ranging from 24000 Da and 38000 Da.

In an embodiment the first peptide of formula (I), and the second peptide selected from the group consisting of peptides of formula (II) and (III), are attached to the polymeric shell by a covalent bond.

In a preferred embodiment, the covalent bond is an amide bond between the amino group of the peptides' N-terminal group and the carboxyl groups from the PLGA polymer at the external surface of the microcapsules.

In this description, the abbreviations used for amino acids follow the recommendations of the 1983 IUPAC-IUB Commission of Biochemical Nomenclature specified in Eur. J. Biochem., (1984), 138, 937.

Thus, for example, Arg or R represents NH$_2$—CH(CH$_2$—CH$_2$—CH$_2$—NH—C(=NH)NH$_2$)—COOH, Arg- or R— represents NH$_2$—CH(CH$_2$—CH$_2$—CH$_2$—NH—C(=NH)NH$_2$)—CO—, -Arg or —R represents —NH—CH(CH$_2$—CH$_2$—CH$_2$—NH—C(=NH)NH$_2$)—COOH, and -Arg- or —R— represents —NH—CH(CH$_2$—CH$_2$—CH$_2$—NH—C(=NH)NH$_2$)—CO—. Therefore, the hyphen, which represents the peptide bond, eliminates the OH in the 1 carboxyl group of the amino acid (represented here in the conventional non-ionized form) when situated to the right of the symbol, and eliminates the H of the 2 amino group of the amino acid when situated to the left of the symbol; both modifications can be applied to the same symbol (see Table 1).

The aminoacids are named using the conventional nomenclature in one and/or three letter codes, as follows:
alanine, Ala or A,
arginine, Arg or R.
asparagine, Asn or N,
glutamine, Gln or Q,
glycine, Gly or G,
leucine, Leu or L,
lysine, Lys or K,
phenylalanine, Phe or F,
proline, Pro or P,
ornithine, Orn,
threonine, Thr or T
tyrosine, Tyr or Y.

The double functionalized-microcapsules, and more particularly the targeted microcapsules of the invention have the advantage that they show higher skin-penetration when compared with conventional microcapsules.

In addition, the targeted bilayered microcapsules can be used as a highly efficient delivery system with sustained and controlled release of the encapsulated active ingredient at the target cells.

Briefly, the use of the targeted microcapsules of the present invention allows decreasing the amount needed of the active ingredients with the consequence that potential side effects are also reduced. Further, the microcapsules have also the advantage that are capable of penetrating skin and show a uniformly distribution on the entire epidermis.

In an embodiment of the present invention, the polymeric shell of the microcapsules according to the first aspect, encapsulates an active ingredient, preferably at least one cosmetic agent.

In a particular embodiment, suitable cosmetic agents are coenzymes Q10, melatonin, avocado oil, *Eucalyptus* oil, virgin olive oil, linalool; linalool-containing essential oils (such as lavender (*Lavandula officinalis*), coriander (*Coriandrum sativum*) seeds, basil (*Ocirnum basilicum*), and hortensia essential oils), *Aniba rosaeodara* wood oil, *Aniba rosaeodara* wood extract, succinic acid, lipoic acid, arginine, citrulline, taurine, pyruvate, resveratrol, olive leaf extract, oleanolic acid, oleanol, green tea extract, acerola extract, creatine, extracts from maize kernels, extracts of black elderberry, extract from cocoa beans, extracts of peppermint, dihydroquercetin (taxifolin), ginger root extract, Galangal, dill extract, or *Zingiber officinale* root extract (COX-2 inhibitor), or *Alpinia officinarum* extract, Turmeric, or *Curcuma longa* root extract, Mango Ginger, or *Curcuma amada, Capsicum,* or *Capsicum annuum* extract, Clove Family, or *Syzygium arornaticum* extract, *Evodia,* or *Evodia rutaecarpa* fruit extract, *Boswellia,* or *Boswellia serrata* extract, SAMe, or S-Adenosylmethionine, *Eucomis,* or *Eucomis L"Herit, Celastrus,* or *Celastrus orbiculatus, Tithonia,* or *Tithonia diversifolia, Kochia,* or *Kochia scoparia* extract, *Scoparia,* or *Scoparia dulcis* extract, Qiang Huo, or *Notopterygium incisum,* cinnamon or *Cinnamonum cassia* extract, Mexican bamboo or *Polygonum cuspidaturn* extract, Ogon, Baikal Scullcap, or *Scuteliaria baicalensis* extract, *Coptis,* Xianglian, or *Coptis chinenesis* extracts, Psoralea, Rumex extract, Baccharis extract, Feverfew extract, Vitis, Stephania extract, *Corydalis* or *Corydalis turtschaninovii* root extract, horse chestnut extract (*Aesculus hippocastanurn* extract), esculin, escin, yohimbine, *Capsicum oleoresin* extract, capsaicin, niacin, niacin esters, methyl nicotinate, benzyl nicotinate, ruscogenins (butchers broom extract; *Ruscus aculeatus* extract), diosgenin (*Trigonella foenumgraecum,* Fenugreek), Emblica extract (*Phyllanthus emblica* extract), asiaticoside (*Centelia asiatica* extract), piperine, melilot (*Melilotus officinalis* extract), glycyrrhetinic acid, ursolic acid, sericoside (*Terminalia sericea* extract), darutoside (*Siegesbeckia orientalis* extract), *Amni visnaga* extract, extract of red vine (*Vitis vinifera*) leaves, apigenin, phytosan, and luteolin; vitamins selected from the group consisting of vitamin A, vitamin B, vitamin C, vitamin E, vitamin H and vitamin K, green tea extract, elagic acid; etc; flavonoids selected from the group consisting of acacetin, apigenin, baicalein, chrysin, diosmetin, diosmin, galangin, hydroxyflavones, isorhamnetin, kaempferol, luteolin, flavanes, isoflavones, queratin, ubiquinone, ubiquinol, silymarin, ectoine, retinoic acid, retinaldehyde, retinal, retinyl, retinoate, retinyl esters, oligomeric proanthocyanidins (OPC), liquorice extract, alpha-bisabolol, azulene, glycyrrhetic acid, aloe vera extract and *Rosmarinum oficinalis* extract; gingerol, shogaol, zingerone, and capsaicin, oroxylum, catechin, hydrolyzed *Xanthomonas campestris* polysaccharide, methylthiopropylamido acetyl methionine, *Limoium narbonense,* geranylgeranylisopropanol, *Laminaria digitate, Jania rubens* extract, *Euglena gracilis* extract, caffeine, and *Glaucium flavum* leaf extract. Preferably the cosmetic agents are selected from the group consisting of coenzymes Q10 and/or melatonin.

The term "alkanoyl" refers to a radical having the general formula RCO— wherein R is an alkyl group.

The term "alkenyloyl" is the same as alkenoyl, and refers to a radical having the general formula RCO— wherein R is a alkenyl group.

As used herein, the term "alkyl" refers to a linear or branched hydrocarbon chain radical consisting of carbon and hydrogen atoms, containing no unsaturation, which is attached to the rest of the molecule by a single bond and, unless otherwise specified, an alkyl radical typically has 1 to about 24 carbon atoms. One more preferred class of alkyl groups has from 1 to about 16 carbon atoms and a more preferred class of alkyl groups has from 1 to 6 and 14 to 18. Even more preferred are alkyl groups having 1, 2, 3, 4, 15, 16 or 17 carbon atoms. Methyl, ethyl, n-propyl, isopropyl and butyl, including n-butyl, tert-butyl, sec-butyl, isobutyl, pentadecyl, hexadecyl, heptadecyl are particularly preferred alkyl groups in the compounds of the present invention. Another preferred class of alkyl groups has from 6 to about 10 carbon atoms; and even more preferably 7, 8 or 9 carbon atoms. Heptyl, octyl and nonyl are the most preferred alkyl groups of this class.

The term "alkenyl" means a linear or branched hydrocarbon chain radical having one or more carbon-carbon double bonds therein and having from two to twelve carbon atoms, and which is attached to the rest of the molecule by a single bond. The double bond of an alkenyl group can be unconjugated or conjugated to another unsaturated group. Suitable alkenyl groups include, but are not limited to alkenyl groups such as vinyl, allyl, butenyl (e.g. 1-butenyl, 2-butenyl, 3-butenyl), pentenyl (e.g. 1-pentenyl, 2-pentenyl, 3-pentenyl, 4-pentenyl), hexenyl (e.g. 1-hexenyl, 2-hexenyl, 3-hexenyl, 4-hexenyl, 5-hexenyl), butadienyl, pentadienyl (e.g, 1,3-pentadienyl, 2,4-pentadienyl), hexadienyl (e.g. 1,3-hexadienyl, 1,4-hexadienyl, 1,5-hexadienyl, 2,4-hexadienyl, 2,5-hexadienyl), 2-ethylhexenyl (e.g. 2-ethylhex-1-enyl, 2-ethylhex-2-enyl, 2-ethylhex-3-enyl, 2-ethylhex-4-enyl, 2-ethylhex-5-enyl), 2-propyl-2-butenyl, 4,6-dimethyl-oct-6-enyl. An alkenyl group can be unsubstituted or substituted with one or two suitable substituents.

"Aryl" herein refers to single and double ring radicals from 6 to about 10 carbon ring atoms, such as phenyl, naphthyl or indenyl. The aryl radical may be optionally substituted by one or more substituents such as hydroxy, mercapto, halo, alkyl, phenyl, alkoxy, haloalkyl, nitro, cyano, dialkylamino, aminoalkyl, acyl, alkoxycarbonyl, etc.

As used herein, "aryl-alkyl" refers to an alkyl radical, as defined above, attached to an aryl radical, as defined above, such as benzyl.

As used herein, "cycloalkyl" refers to a saturated carbocyclic ring having from 3 to 8 carbon atoms.

As used herein, "heteroaryl" refers to a 5 or 6 membered monocyclic aromatic ring or 8, 9 or 10 membered bicyclic aromatic ring, which contains carbon atoms and 1, 2, 3 or 4 heteroatoms in the ring independently selected from the group consisting of N, O and S, such as pyridine.

As used herein, "heteroarylalkyl" refers to an alkyl radical, as defined above, attached to a heteroaryl radical, as defined above.

As used herein, "heterocycle" refers to a 5, 6 or 7 membered, saturated or partially saturated ring, which contains carbons atoms and 1, 2 or 3 heteroatoms in the ring independently selected from the group consisting of N, O and S. Examples of heterocycles are benzimidazole, benzothiazole, furan, isothiazole, imidazole, indole, piperidine, piperazine and morpholine.

The peptides of formula (II) may be prepared as described in WO 2016/135203 A1 and peptides of formula (I) and (III) may be prepared by routine techniques of peptide synthesis known to the skilled in the art. One particularly useful technique consists of five steps carried out in a cyclic fashion.

Step 1—Attaching an amino acid to the polymer, the amino acid is reacted with a molecule known as a "linkage agent" that enables it to attach to a solid polymer, and the other end of the linkage agent is reacted with the polymer support.

Step 2—Protection

An amino acid is an acid with a basic group at one end and an acid group at the other. To prevent an amino acid from reacting with itself, one of these groups is reacted with something else to make it unreactive.

Step 3—Coupling

The protected amino acid is then reacted with the amino acid attached to the polymer to begin building the peptide chain.

Step 4—Deprotection

The protection group is now removed from the acid at the end of the chain so it can react with the next acid to be added on. The new acid is then protected (Step 2) and the cycle continues until a chain of the required length has been synthesized.

Step 5—Polymer removal

Once the desired peptide has been obtained the bond between the first amino acid and the linkage agent is broken to give the free peptide.

The terminal group $NH_2$ is introduced by routine techniques known to the skilled in the art.

The cosmetically acceptable salts of the peptides provided by this invention are also within the scope of the present invention. The term "cosmetically acceptable salts" means a salt generally admitted for its use in animals and more particularly in human beings, and includes the salts used to form base addition salts, either inorganic base addition salts, such as for example and in a non-limiting sense, lithium, sodium, potassium, calcium, magnesium or aluminium among others, or organic base addition salts, such as for example and in a non-limiting sense ethylamine, diethylamine, ethylenediamine, ethanolamine, diethanolamine, arginine, lysine, histidine or piperazine among others, or acid addition salts, either organic acid addition salts, such as for example and in a non-limiting sense acetate, citrate, lactate, malonate, maleate, tartrate, fumarate, benzoate, aspartate, glutamate, succinate, oleate, trifluoroacetate, oxalate, pamoate or gluconate among others, or inorganic acid addition salts, such as for example and in a non-limiting sense chloride, sulfate, borate or carbonate among others. The nature of the salt is not critical, provided that it is cosmetically acceptable. The cosmetically acceptable salts of the peptide derivatives of the invention can be obtained by conventional methods well known in the state of the art [Berge S. M., Bighley L. D. and Monkhouse D. C. (1977) "Pharmaceutical Salts" J. Pharm. Sci. 66:1-19].

Additionally, it will be appreciated that non-cosmetically acceptable salts also fall within the scope of the invention since said non-cosmetically acceptable salts may be useful precursors in the preparation of cosmetically acceptable salts. The preparation of salts can be carried out by methods known in the art. For instance, cosmetically acceptable salts of compounds provided herein may be acid addition salts, base addition salts or metallic salts, and they can be synthesized from the parent compound which contains a basic or acidic moiety by conventional chemical methods. Generally, such salts are, for example, prepared by reacting the free acid or base forms of these compounds with a stoichiometric amount of the appropriate base or acid in water or in an organic solvent or in a mixture of the two. Generally, non-aqueous media like ether, ethyl acetate, ethanol, isopropanol or acetonitrile are preferred. Examples of the acid addition salts include mineral acid addition salts such as, for example, hydrochloride, hydrobromide, hydroiodide, sulphate, nitrate, phosphate, and organic acid addition salts such as, for example, acetate, maleate, fumarate, citrate, oxalate, succinate, tartrate, malate, mandelate, methanesulphonate and p-toluenesulphonate. Examples of the alkali addition salts include inorganic salts such as, for example, ammonium, and organic alkali salts such as, for example, ethylenediamine, ethanolamine, N,N-dialkylenethanolamine, triethanolamine, glucamine and basic aminoacids salts.

Examples of the metallic salts include, for example, sodium, potassium, calcium, magnesium, aluminium and lithium salts.

The second aspect of the present invention relates to a process for the preparation of microcapsules of the invention, comprising the steps of:

a) coupling a first peptide of formula (I) as defined in the first aspect of the invention to a first portion of PLGA;
b) preparing an activated form of a second portion of PLGA by reaction with a suitable coupling agent;
c) adding a solution of the material obtained in step a) in a first solvent and a solution of the material obtained in step b) in a second solvent, to an aqueous solution, optionally comprising a second shell-forming polymeric material and optionally comprising a material to be encapsulated, thereby obtaining a colloidal suspension;
d) evaporating said first and second solvents;
e) adding a second peptide selected from the group consisting of peptides of formulae (II) and (III) to the material obtained in step d);
f) incubating the mixture resulting from step e), wherein microcapsules functionalized with said first and second peptides are obtained;
g) isolating the microcapsules functionalized with said first and second peptides.

PLGA has carboxyl groups, which can be activated for subsequent coupling to the N-terminal of peptides of formulae (I) to (III). Routine techniques known in the art can be used to activate the carboxyl groups of PLGA for amide-bond forming reactions, such as via the N-hydroxysuccinimide esters (NHS-esters) as coupling agent.

In the context of the present invention a coupling agent is a chemical agent used to activate the desired chemical function, i.e. carboxylic acids in the present invention, to facilitate and/or promote the subsequent introduction (coupling), of a desired molecule via the formation of a new chemical bond, i.e. a chemical agent used to facilitate the formation of an amide bond between the carboxylic acid group of the polymer of the invention and the amino group of the peptides of formulae (I) to (III).

In a preferred embodiment the second shell-forming polymeric material is polyvinyl alcohol (PVA).

In a particular embodiment the activated form of the shell-forming polymer, is the N-hydroxysuccinimide ester of PLGA, i.e. PLGA-NHS-ester.

In an embodiment, the first and second solvents of step c) are the same. Suitable solvents comprise acetone, acetonitrile, dichloromethane (DCM), diethyl ether ($Et_2O$), dimethyl sulfoxide (DMSO), ethanol, methanol, chloroform, dimethylformamide (DMF), ethyl acetate, and mixtures thereof, preferably acetone.

In a particular embodiment, the incubation of step f) is carried out for at least 10 hours, preferably at least 17 hours, more preferably at least 24 hours.

In a particular embodiment step f) is performed at a temperature comprised between 10° C. and 50° C., preferably 15° C. and 40° C., more preferably between 20° C. and 25° C.

In an embodiment, the isolation of step g) is performed by centrifugation.

The third aspect of the present invention relates to a composition comprising the microcapsules as defined in the first aspect, further comprising at least one cosmetically acceptable excipient and/or adjuvant.

The term excipients and/or adjuvants also relate to carriers. Such cosmetically excipients, adjuvants or carriers can be liquids, such as water, oils or surfactants, including those of petroleum, animal, plant or synthetic origin, such as for example and in a non-limiting sense peanut oil, soybean oil, mineral oil, sesame oil, castor oils, polysorbates, sorbitan esters, ether sulfates, sulfates, betaines, glucosides, maltosides, fatty alcohols, nonoxinols, poloxamers, polyoxyethylenes, polyethylene glycols, dextrose, glycerol and the like, "Remington's Pharmaceutical Sciences" by E. W. Martin describes diluents, adjuvants or excipients as suitable carriers. Preferably, as used herein, it means that said excipient is included in the European Commission database for cosmetic substances an ingredients CosIng.

In a fourth aspect the present invention relates to the use of a peptide of formula (I) as defined in the first aspect of the invention for the preparation of microcapsules having an outer layer comprising said peptide for the transdermal delivery of an active ingredient.

In a preferred embodiment, the present invention relates to the use of a peptide of formula (I) for the preparation of microcapsules having an outer layer comprising said peptide. In a most preferred embodiment the outer layer of the microcapsules further comprises a second peptide selected from the group consisting of peptides of formulae (II) and (III).

The microcapsules of the present invention when comprising an active ingredient encapsulated therein, can be used as a deliver system for said active ingredient. Thus, in a fifth aspect, the present invention relates to the use of the microcapsules of the first aspect as a transdermal delivery system for an activated ingredient encapsulated therein.

In a sixth aspect, the present invention relates to a method for the transdermal delivery of active ingredients comprising the administration to the skin of said ingredients encapsulated in microcapsules defined in the first aspect.

In particular embodiments the transdermal delivery system of the fifth and sixth aspects, directs the active ingredient towards the mitochondria.

In a particular embodiment the microcapsules of the invention can encapsulate a metal and/or non-metal microparticle. Suitable metal and/or non-metal microparticles can be selected from the group comprising gold microparticles, silver microparticles, platinum microparticles and silica microparticles.

The following examples are merely illustrative of certain embodiments of the invention and cannot be considered as restricting it in any way.

Abbreviations

CHCl$_3$: Chloroform
DIPEA: N,N-diisopropylethylamine
DCM: Dichloromethane
DMF: Dimethylformamide
DMSO: Dimethyl sulfoxide
EDC: 1-Ethyl-3-(3-dimethylaminopropyl)carbodiimide
Et$_2$O—Diethyl ether
Fmoc: Fluorenylmethyloxycarbonyl
HPLC: High-performance liquid chromatography
HBTU: O-(Benzotriazol-1-yl)-N,N,N,N'-tetramethyluronium hexafluorophosphate
$^1$H-NMR: Proton Nuclear Magnetic Resonance
λem: Emission wavelength
λex: Excitation wavelength
MeOH: Methanol
NHS: N-hydroxysuccinimide
PBS: Phosphate-buffered saline
PLGA: Poly(D,L-lactide-co-glycolide) acid
PVA: Poly(vinyl alcohol)
TFA: Trifluoroacetic acid
TIS: Triisopropylsilane
UV: Ultraviolet light

EXAMPLES

Materials and Methods

Poly(D,L-lactide-co-glycolide) acid (50:50) Resomer® 503H, EDC, NHS, DMSO, Et$_2$O, DIPEA, DCM, methanol, poly (vinyl alcohol), were purchased from Sigma-Aldrich.
Determination of the Microcapsules Size by Dynamic Light Scattering (DLS)

The mean particle size was measured using a Zetasizer Nano ZS (Malvern Instruments, Malvern, UK) at an angle of 90° in 10 mm diameter cells at 25° C. The refractive index of the dispersing phase (water) was 1.33. Particle size was obtained by the average of 10 measurements of three different batches. Prior to the measurement all samples were diluted with ultra-purified water to depict a suitable scattering intensity. The preparation of the samples, in case of solid samples, consists of weighing 1 mg, and suspending it in 1 mL of MilliQ H$_2$O. In case of liquid samples collecting a 50 µL aliquot from the sample is taken, using an automatic pipette, and added to 950 µL of MilliQ H$_2$O, in such a way that the sample concentration is always 1 mg/mL.
General HPLC Method Quantitative and/or qualitative analysis of the synthesized peptides, and microcapsules' functionalization, and analysis of the skin permeation test results were performed on an HPLC system equipped with a Waters 996 photodiode array detector, coupled with a Waters 2695 separation module, and Empower®3 software. A reverse phase HPLC column Waters Xbridge BEH130 C18 4.6×150 mm 5 µm, was used. UV detection was performed at UV 220 nm; flux 1 mL/min; gradient acetonitrile-water in 8 min. The solvent gradients used are as follows:

Peptide of formula (I): linear gradient from 5 to 100% of ACN (+0.036% TFA) into water (+0.045% TFA) were run at 1.0 mL/min flow rate over 8 minutes.

Peptide of formula (II): linear gradient from 5 to 100% of ACN (+0.036% TFA) into water (+0.045% TFA) were run at 1.0 mL/min flow rate over 8 minutes.

Peptide of formula (III): linear gradient from 0 to 10% of ACN (+0.036% TFA) into water (+0.045% TFA) were run at 1.0 mL/min flow rate over 8 minutes.

Example 1. Target Peptide Synthesis

The peptides of the invention have been prepared using the protocol described below.

In this Example AA refers to the amino acids of the peptide. The amino acids are those corresponding to the peptide of formula (I), i.e. D-Arg-Tyr-Orn-Phe-NH$_2$(SEQ ID NO: 3-NH$_2$). Chemical peptide synthesis starts at the C-terminal end of the peptide and ends at the N-terminus. Therefore, the first AA is Phe for the peptide of formula (I), Pro for the peptide of formula (II), and Ser for the peptide of formula (III).

Fmoc-AA-OH (3 eq) was directly incorporated on the resin (0.5 mmol/g) with HBTU (3 eq), DIPEA (6 eq) in DMF for 1 h. Depending on the desired C-termination a Fmoc-RinkAmide or a 2-Chlorotrityl resin was used. Washings were performed with DMF (5×30 s) and DCM (5×30 s). Kaiser test was used to verify that the coupling was successful. For the deprotection of the Fmoc group, the resin was solvated with DMF (5×30 s), treated with a solution of piperidine/DMF 20% (3×5 min) and finally washed with DMF (5×30 s) and DCM (5×30 s), Then, the resin was solvated with DMF (5×30 s). The same procedure was successively repeated n times with the following amino acids Fmoc-AA-OH. Finally, the cleavage of the peptide from the resin was carried out by treating the resin with TFA:TIS:H$_2$O (95:2.5:2.5) for 1 h, yielding the peptide of sequence. HPLC: C18 column; UV 220 nm; flux 1 mL/min; gradient acetonitrile-water in 8 min. The solvent gradients used are those described in the General HPLC method.

Peptide of formula (I) (D-Arg-Tyr-Orn-Phe-NH$_2$) (SEQ ID NO: 3-NH$_2$) and peptides of formulae (II) (Lys-Phe-Asn-Leu-Pro-Ala-Gly-Asn-Tyr-Lys-Lys-Pro-NH$_2$) (SEQ ID NO: 1-NH$_2$) and (III) (Lys-Thr-Thr-Lys-Ser-OH) (SEQ ID NO: 2-OH) were synthesized according to this procedure.

Example 2: Preparation of the Microcapsules

Example 2-1. Preparation of Activated Polymer (PLGA-NHS)

1 g of Poly(D,L lactide-co-glycolide) (PLGA) (Resomer® RG 503 H, lactide/glycolide molar ratio 50:50) was dissolved in CHCl$_3$ (5 mL) with stirring in a tightly sealed vial. Then, EDC (45 mg) and NHS (27 mg), were subsequently added, and the resulting mixture stirred overnight at room temperature. Et$_2$O (10 mL) was added and the product precipitated. The resulting suspension was centrifuged at 5000 rpm for 5 minutes at 4° C. The supernatant was discarded, and the solid was re-dissolved in CHCl$_3$ (5 mL). The washing procedure; precipitation with Et$_2$O followed by centrifugation, was repeated two additional times. After the final washing cycle, the solid was collected, dried under vacuum and stored at −20° C.

Example 2-2. Preparation of Bi-Functionalized PLGA Microcapsules

1st step: 0.25 g of the polymer prepared in example 2-1 was dissolved in DMSO (2.5 mL). Then, under stirring, DIPEA (10 μL), followed by peptide of formula (I) (0.1 g) were added. The resulting mixture was stirred overnight at room temperature. Et$_2$O (5 mL) was added and the product precipitated. The resulting suspension was centrifuged at 5000 rpm for 5 minutes at 4° C. The supernatant was discarded, and the solid was re-dissolved in DCM, and subsequently precipitated with MeOH. The resulting suspension was centrifuged, after which the supernatant was discarded. The precipitation-centrifugation procedure was carried out two additional times. After the final washing cycle, the solid was collected, and dried under reduced pressure, affording PLGA functionalized with peptide of formula (I) (D-Arg-Tyr-Orn-Phe-NH$_2$) (SEQ ID NO: 3-NH$_2$) (PLGA-peptide (I)).

The extent of coupling of peptide of formula (I) to the PLGA polymer was determined by $^1$H-NMR spectroscopy, by measuring the relative peak area of the signals at 6.60 ppm corresponding to the aromatic hydrogens (2H) of the Tyr and signal at 5.2 ppm corresponding to the proton of poly-lactic acid unit (PLA) of the PLGA polymer. The sample was dissolved in deuterated DMSO (DMSO-d) and the spectrum recorded on a Bruker Avance III 400 MHz, at 298 K (25° C.).

2nd step: An acetone solution (25 mL) of PLGA-NHS (0.25 g), and peptide of formula (I)-functionalized polymer (0.35) was added to an aqueous solution (100 mL) of poly (vinyl alcohol) (PVA) (0.3 g), under moderate stirring. The resulting colloid was stirred for an additional 10 minutes. Acetone was evaporated affording a water dispersion of microcapsules functionalized with peptide of formula (I).

3rd step: To the obtained mono-functionalized microcapsule dispersion in water, peptide of formula (II) (Lys-Phe-Asn-Leu-Pro-Ala-Gly-Asn-Tyr-Lys-Lys-Pro-NH$_2$) (SEQ ID NO: 1-NH$_2$), or peptide of formula (III) (Lys-Thr-Thr-Lys-Ser-OH) (SEQ ID NO: 2-OH), (0.1 g) was added, and the mixture was incubated under gentle stirring, for 24 hours at room temperature. Unreacted peptide was separated from the microcapsules by centrifugation at 14.000 rpm and 4° C. for 30 minutes and subsequently washed with deionized water three times. Finally, the microcapsules were freeze-dried to dryness.

The collected solid was freeze-dried affording the microcapsules bi-functionalized with peptides of formula (I) and (II), or peptides of formula (I) and (III).

The binding of peptides of formula (II) or (III) to the mono-functionalized microcapsules was indirectly determined by quantifying the amount of the respective peptide remaining in solution. This reaction was monitored by HPLC: C18 column; UV 220 nm; flux 1 mL/min; using the gradient defined for peptide of formula (II) or (Ill) of the general HPLC method, in 8 min. The binding of peptide of formula (II) or (III) to the mono-functionalized microcapsules proceeds in 85% to 90% efficiency.

The obtained microcapsules have the composition shown below.

Peptide of formula (I)—10% by weight
Peptide of formula (II) or peptide of formula (III)—10% by weight
PLGA—50% by weight
PVA—30% by weight Example 2-3. Preparation of Non-Functionalized PLGA Microcapsules 0.7 g of PLGA in acetone (25 mL) were added under gentle stirring to an aqueous solution (100 mL) of PVA (0.3 g). The resulting colloidal suspension was stirred for 10 minutes. The acetone was evaporated and the capsules concentrated under reduced pressure.

In order to obtain non-functionalized microcapsules encapsulating an active ingredient, the desired amount of said ingredient is dissolved in the organic solution comprising PLGA, which is subsequently added to the aqueous solution of PVA under moderate stirring, and the remaining procedure applies.

Example 2-4. Preparation of Mono-Functionalized PLGA-Peptide (II) or Peptide (III) Microcapsules Encapsulating an Active Ingredient Following the protocol described in example 2-2, starting from the second step, wherein the peptide used do functionalized the PLGA-NHS activated polymer is a peptide of formula (II) or peptide of formula (III). In order to obtain mono-functionalized microcapsules encapsulating an active ingredient, the desired amount of said ingredient is dissolved in the organic solution comprising PLGA and/or PLGA-peptide formula (II) or peptide of formula (III), which is subsequently added to the aqueous solution of PVA under moderate stirring.

Isolation of the prepared microparticles can be carried out as set out in the third step of example 2-2.

Example 2-5, Preparation of Bi-Functionalized PLGA-Peptides (1) and (II), or Bi-Functionalized PLGA-Peptides (I) and (III) Microcapsules Encapsulating an Active Ingredient Following the protocol described in example 2-2, starting from the second step, in order to obtain microcapsules encapsulating an active ingredient, the desired amount of said ingredient is dissolved in the organic solution comprising PLG-NHS and/or PLG-peptide formula (I), which is subsequently added to the aqueous solution of PVA under moderate stirring.

Step 3 is carried out as described in example 2-2, using peptide of formula (II) or peptide of formula (III).

Example 3: Skin Penetration Assay

The skin penetration of the microcapsules according to the invention, in comparison with an active ingredient per se, and non-functionalized microcapsules, was evaluated as follows.

Example 3-1 Preparation of the Compositions to Assay

Composition A (Rhodamine): Composition A corresponds to a 0.0056% (weight/volume) Rhodamine solution in water was prepared using a vortex mixer]

Composition B (comprising non-functionalized PLGA microcapsules encapsulating Rhodamine): Composition B corresponds to a 3% (weight/volume) dispersion in water of microcapsules according to example 2-3 encapsulating 0.0056% (weight/volume) of Rhodamine prepared using a vortex mixer.

Compositions C and D (comprising mono-functionalized PLGA-peptide (II) or peptide (III) microcapsules encapsulating Rhodamine): Compositions C and D correspond to a 3% (weight/volume) dispersion in water of microcapsules according to examples 2-4, encapsulating 0.0056% (weight/volume) of Rhodamine.

Compositions E and F (comprising bi-functionalized PLGA-peptide (I) and (II), or peptide (I) and (III) microcapsules encapsulating Rhodamine): Compositions E and F correspond to a 3% (weight/volume) dispersion in water of microcapsules according to examples 2-5, encapsulating 0.0056% (weight/volume) of Rhodamine,

| Composition | Rhodamine | PLGA (%) | Peptide (I) | Peptide (II) | Peptide (III) | PVA | Water q.s. (%) |
|---|---|---|---|---|---|---|---|
| A | 0.0056 | — | — | — | — | | 100 |
| B | 0.0056 | 2.59 | — | — | — | 1.11- | 100 |
| C | 0.0056 | 2.22 | — | 0.37- | | 1.11 | 100 |
| D | 0.0056 | 2.22 | — | | 0.37 | 1.11 | 100 |
| E | 0.0056 | 1.85 | 0.37 | 0.37 | — | 1.11 | 100 |
| F | 0.0056 | 1.85 | 0.37 | — | 0.37 | 1.11 | 100 |

Example 3-2. Franz Diffusion Test

The skin penetration assay was carried out in pigskin using Franz cells, Pigskin samples were cut into 3 cm diameter circles. The skin samples were mounted on top of a receptor compartment of a Franz diffusion cell assembly, with the stratum corneum side facing upwards into the donor compartment. 18 mL of Phosphate-buffer saline (PBS) were used as the receptor solution. An aliquot of compositions A, B, C D, E and F respectively, were applied on the skin samples.

The Franz diffusion cells were mounted on a H+P Labortechnik Varimag Telesystem (Munich, Germany), and kept in a thermostatic bath at 32° C. (Hakke).

Samples were collected after 2 and 6 hours of incubation time, and analyzed by fluorescence spectrophotometry (λex=543 nm, and λem=572 nm) to determine rhodamine presence in the effluent.

Example 3-3. Determination of Rhodamine Content

Fluorescence spectrophotometry was carried out to quantify Rhodamine in the effluent. Samples were excited with a 543 nm laser and emission registered at 572 nm using a Biotek FLx800 Fluorescence Microplate Reader.

The results of the skin penetration assays are shown in table 1.

TABLE 1

| Composition | Skin Penetration - 2 hours (%) | Skin Penetration - 6 hours (%) |
|---|---|---|
| A (Rhodamine) | 5 | 15 |
| B (PLGA-capsules) | 23 | 37 |
| C (Peptide (II) mono-functionalized PLGA-capsules) | 30 | 48 |
| D (Peptide (III) mono-functionalized PLGA-capsules) | 28 | 55 |
| E(Peptides (I) and (II) bi-functionalized PLGA-capsules) | 65 | 87 |
| F (Peptides (I) and (III) bi-functionalized PLGA-capsules) | 67 | 91 |

The results shown on table 1 clearly show that the bi-functionalized microcapsules according to the invention have a higher skin penetration than non-functionalized microcapsules and/or mono-functionalized microcapsules, thus having a superior performance for the delivery of active ingredients through the skin.

The invention claimed is:

1. A microcapsule, comprising:

a polymeric shell comprising poly(D,L-lactide-co-glycolide) acid (PLGA), a first peptide of formula (I)

(I)

(SEQ ID NO: 3-NH$_2$)

D-Arg-Tyr-Orn-Phe-NH$_2$ coupled to said polymeric shell, and a second peptide selected from the group consisting of a peptide of formula (II) and a peptide of formula (III)

(II)

(SEQ ID NO: 1-NH$_2$)

Lys-Phe-Asn-Leu-Pro-Ala-Gly-Asn-Tyr-Lys-Lys-Pro-NH$_2$, and (III)

(SEQ ID NO: 2-OH)

Lys-Thr-Thr-Lys-Ser-OH, coupled to said polymeric shell.

2. The microcapsule according to claim 1, wherein an average particle size as determined by Dynamic Light Scattering is between 100 to 1000 nm.

3. The microcapsule according to claim 1, wherein the polymeric shell comprises the PLGA and at least one further polymer.

4. The microcapsule according to claim 1, wherein the polymeric shell comprises more than one layer.

5. The microcapsule according to claim 4, wherein the microcapsule is a bilayered microcapsule, comprising an inner layer and an outer layer.

6. The microcapsule according to claim 5, wherein the outer layer comprises poly (vinyl alcohol) (PVA).

7. The microcapsule according to claim 1, wherein the polymeric shell encapsulates at least one active ingredient.

8. A process for the preparation of microcapsules as defined in claim 1, comprising:

a) coupling the first peptide of formula (I) to a first portion of a first microcapsule shell-forming polymeric material, to obtain a first material;

b) preparing an activated form of a second portion of the first microcapsule shell-forming polymeric material by reaction with a suitable coupling agent, to obtain a second material;

c) adding a solution of the first material obtained in a) in a first solvent and a solution of the second material obtained in b) in a second solvent, to an aqueous solution, wherein the aqueous solution optionally comprises a second shell-forming polymeric material and optionally comprises a material to be encapsulated, thereby obtaining a colloidal suspension;

d) evaporating said first solvent and second solvent, to obtain a third material;

e) adding the second peptide selected from the group consisting of the peptide of formula (II) and the peptide of formula (III), to the third material obtained in d), to obtain a mixture;

f) incubating the mixture resulting from e), wherein the microcapsules functionalized with said first peptide and second peptide are obtained; and g) isolating the microcapsules functionalized with said first peptide and second peptide.

9. A composition, comprising:

the microcapsule as defined in claim 1, and at least one cosmetically acceptable excipient and/or adjuvant.

10. A method for the preparation of microcapsules, the method comprising:

forming at least one microcapsule having an outer layer comprising a peptide of formula (I)

(I)  (SEQ ID NO: 3-NH$_2$)
D-Arg-Tyr-Orn-Phe-NH$_2$.

11. The method according to claim 10, wherein the outer layer further comprises a second peptide selected from the group consisting of a peptide of formula (II) and a peptide of formula (III)

(II)  (SEQ ID NO: 1-NH$_2$)
Lys-Phe-Asn-Leu-Pro-Ala-Gly-Asn-Tyr-Lys-Lys-Pro-NH$_2$,
and (III)  (SEQ ID NO: 2-OH)
Lys-Thr-Thr-Lys-Ser-OH.

12. A transdermal delivery system, comprising the microcapsule according to claim 7, wherein the at least one active ingredient is encapsulated therein.

13. The transdermal delivery system according to claim 12, wherein the transdermal delivery system directs the at least one active ingredient towards mitochondria.

14. A method for the transdermal delivery of active ingredients, the method comprising:

administering the microcapsule according to claim 1 to skin, wherein the microcapsule comprises at least one active ingredient encapsulated therein.

15. The method according to claim 14, wherein the at least one active ingredient is targeted to achieve its effect in mitochondria.

16. The microcapsule according to claim 2, wherein the average particle size is from 150 to 450 nm.

17. The microcapsule according to claim 2, wherein the average particle size is from 180 to 400 nm.

18. The microcapsule according to claim 7, wherein the at least one active ingredient is at least one cosmetic agent.

\* \* \* \* \*